United States Patent
Li et al.

(10) Patent No.: US 8,468,951 B2
(45) Date of Patent: Jun. 25, 2013

(54) ACTUATING MECHANISM AND MOBILE PLATFORM USING THE SAME

(75) Inventors: Shen-Chun Li, New Taipei (TW);
Hsien-Chuan Liang, New Taipei (TW);
Shou-Kuo Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 227 days.

(21) Appl. No.: 13/172,834

(22) Filed: Jun. 30, 2011

(65) Prior Publication Data

US 2012/0241232 A1  Sep. 27, 2012

(30) Foreign Application Priority Data

Mar. 21, 2011  (TW) .................................. 100109609

(51) Int. Cl.
*B61B 3/02* (2006.01)
*B60K 1/02* (2006.01)
*F16H 21/12* (2006.01)

(52) U.S. Cl.
USPC ............ 105/155; 104/94; 104/130.07; 74/63; 180/65.6

(58) Field of Classification Search
USPC .......... 74/25, 63; 104/89, 94, 130.01, 130.07; 105/148, 155; 180/65.6
See application file for complete search history.

(56) References Cited

U.S. PATENT DOCUMENTS

| | | | | |
|---|---|---|---|---|
| 2,249,531 A | * | 7/1941 | Landahl | 105/155 |
| 5,203,265 A | * | 4/1993 | Nii et al. | 105/29.1 |
| 5,355,804 A | * | 10/1994 | Garcia et al. | 104/93 |
| 6,718,885 B1 | * | 4/2004 | Risser et al. | 105/30 |
| 6,910,425 B2 | * | 6/2005 | Galpin et al. | 105/30 |
| 8,245,647 B2 | * | 8/2012 | Oguro et al. | 104/96 |
| 2002/0157562 A1 | * | 10/2002 | Akiyama | 104/130.01 |
| 2004/0025739 A1 | * | 2/2004 | Matsukawa | 104/96 |
| 2009/0126598 A1 | * | 5/2009 | Takeda | 105/148 |
| 2012/0269471 A1 | * | 10/2012 | Li et al. | 384/26 |

* cited by examiner

*Primary Examiner* — S. Joseph Morano
*Assistant Examiner* — Zachary Kuhfuss
(74) *Attorney, Agent, or Firm* — Altis Law Group, Inc.

(57) ABSTRACT

An actuating mechanism includes first and second hollow outer shafts, two rotating wheels located between the first and second outer shafts, and an inner shaft received in the second outer shaft. Each of the first and second outer shafts forms a connecting portion at one end thereof. Each connecting portion defines two receiving holes. Each rotating wheel includes a body and a rod extending through the body. The bodies of the rotating wheels are in contact with each other. Two ends of the rod of each rotating wheel are correspondingly received in the receiving holes of the first and second outer shafts to connect the first and second outer shafts together. One end of the inner shaft contacts the rod of one rotating wheel. The inner shaft is rotatable in the second outer shaft to drive the two rotating wheels to rotate.

20 Claims, 6 Drawing Sheets

US 8,468,951 B2

ACTUATING MECHANISM AND MOBILE PLATFORM USING THE SAME

BACKGROUND

1. Technical Field

The disclosure relates to an actuating mechanism and a mobile platform using the actuating mechanism.

2. Description of Related Art

In many workshops, a mobile platform moves along a rail mounted on a ceiling of the workshop. The mobile platform has a manipulator of a robot suspended therefrom, and controls a production line below the mobile platform. However, the level of automatization provided by a conventional mobile platform is rather low, and it may be difficult to precisely control the production line.

What is needed, therefore, is an actuating mechanism and a mobile platform using the same which can overcome the limitations described.

DETAILED DESCRIPTION

Figure 1:
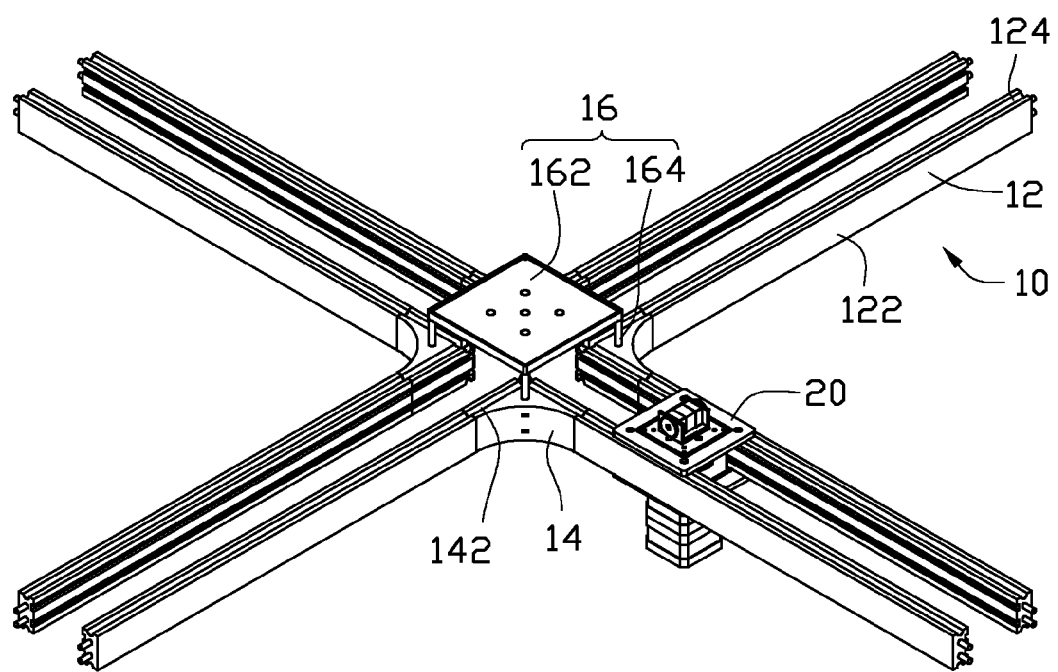
FIG. 1 is an assembled, isometric view of a mobile platform in accordance with an embodiment of the disclosure, in which the mobile platform is mounted on a guideway mechanism.

Referring to FIG. 1, a mobile platform 20 in accordance with an embodiment is shown. The mobile platform 20 is mounted on a guideway mechanism 10 and can move along the guideway mechanism 10. The mobile platform 20 can be used to hang (suspend) a manipulator of a robot therefrom.

The guideway mechanism 10 is substantially cross-shaped. The guideway mechanism 10 can be mounted on a ceiling of a workshop. The guideway mechanism 10 includes four branches 12. Each branch 12 includes two parallel rails 122. Each rail 122 defines two elongated grooves 124 respectively in top and bottom sides thereof along a lengthwise direction. Two adjacent rails 122 respectively located in two adjacent branches 12 are perpendicular to each other, and are connected together by a V-shaped connecting block 14. Each connecting block 14 defines two elongated grooves 142 in each of top and bottom sides thereof. Each groove 142 of the connecting block 14 communicates with one groove 124 of a corresponding rail 122. All the connecting blocks 14 are connected to a supporting bracket 16. The supporting bracket 16 includes a rectangular top plate 162, and four supporting poles 164 extending perpendicularly downwardly from four corners of the top plate 162. Each supporting pole 164 connects a corresponding connecting block 14.

Figure 2:
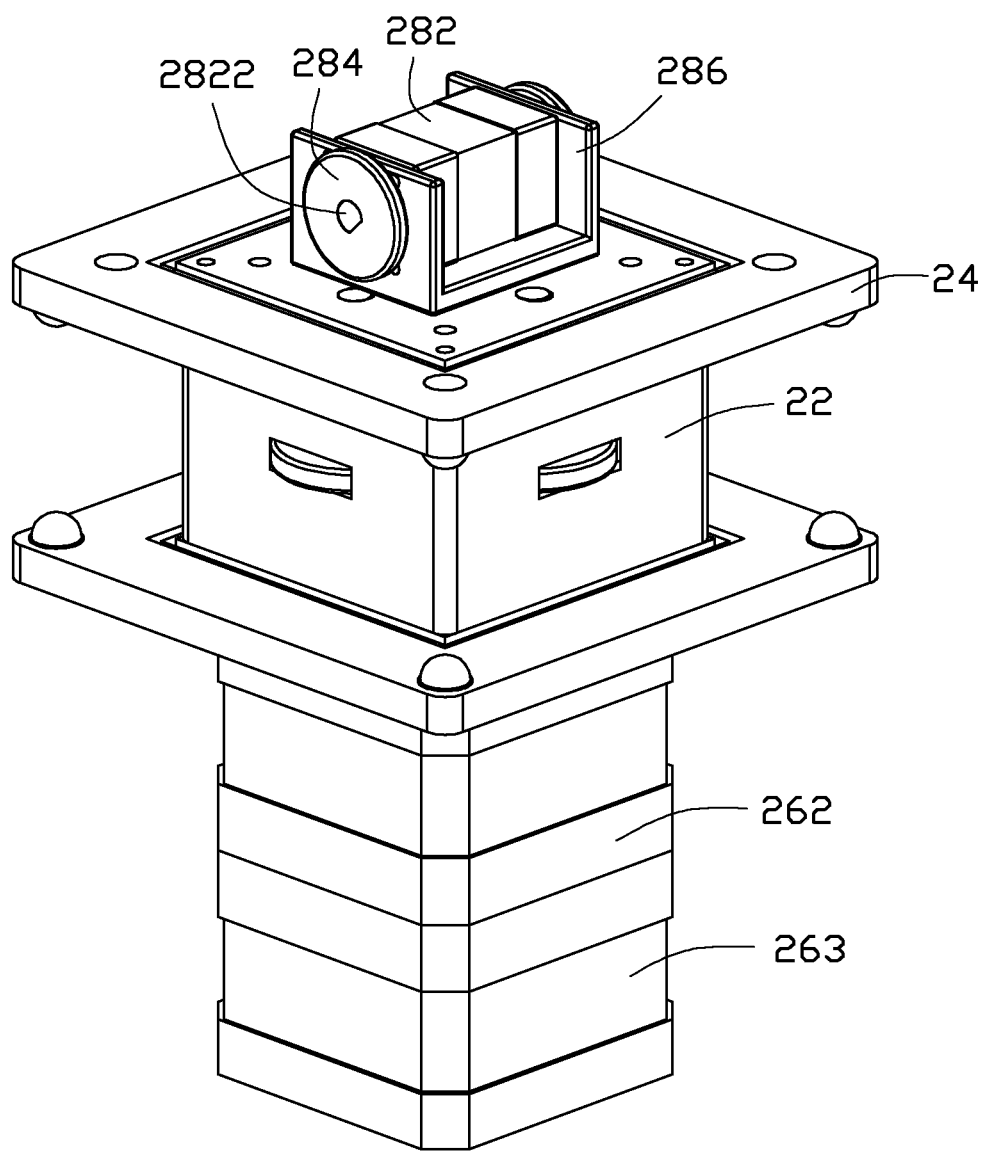
FIG. 2 is an enlarged view of the mobile platform of FIG. 1.
Figure 3:
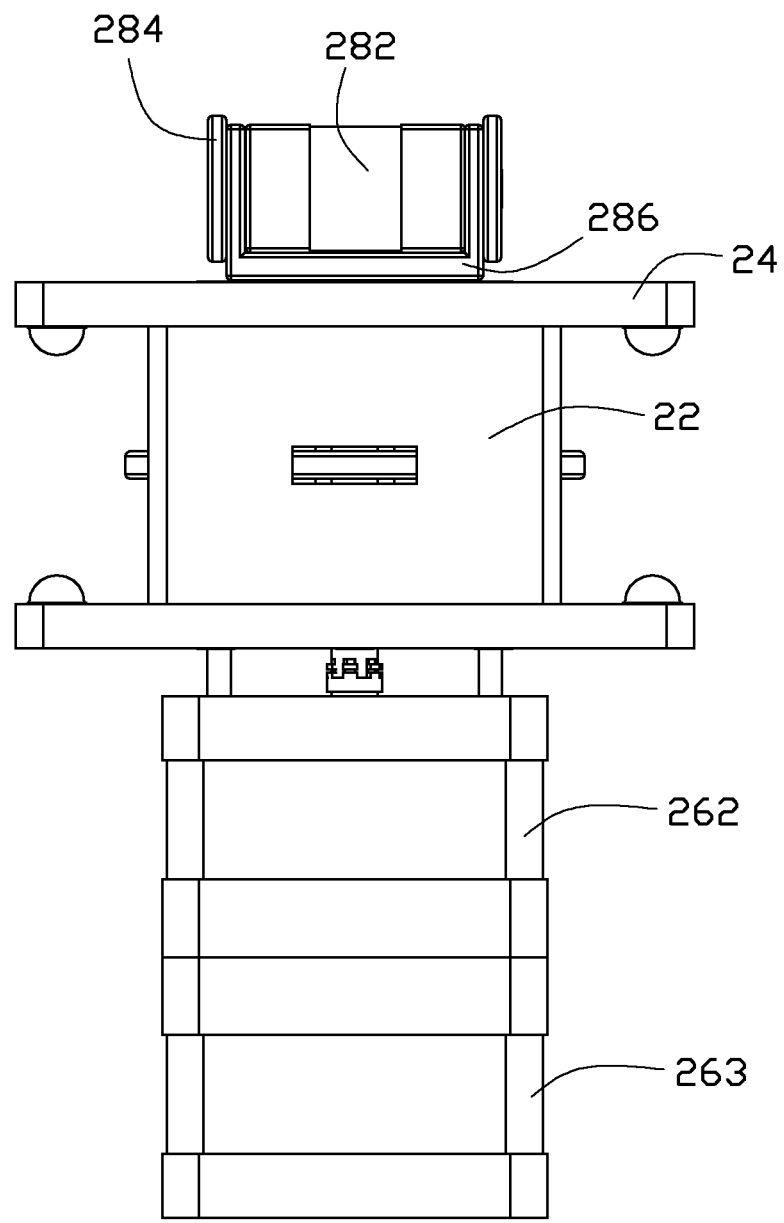
FIG. 3 is a front elevational view of the mobile platform of FIG. 2.
Figure 4:
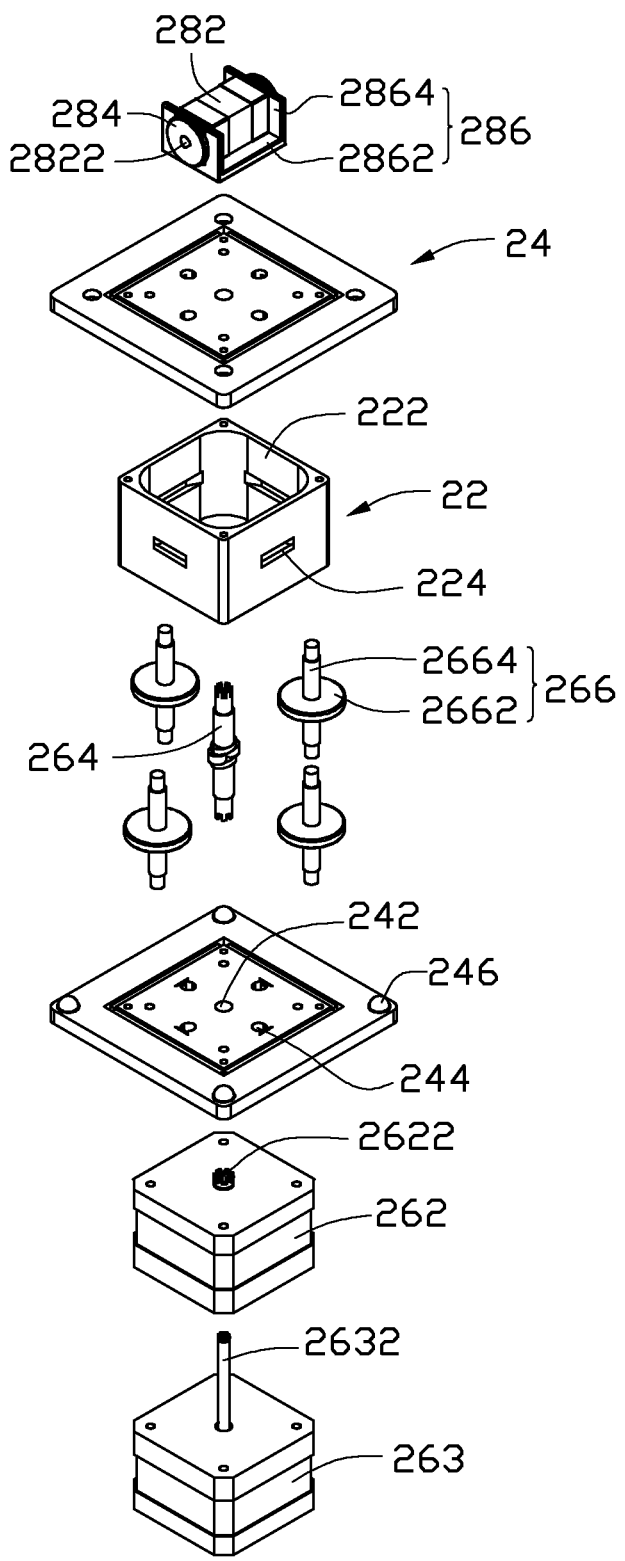
FIG. 4 is an exploded view of the mobile platform of FIG. 2.

Also referring to FIGS. 2-4, the mobile platform 20 includes a frame 22, two rectangular supporting plates 24, first and second active elements, an actuating mechanism 264, and first and second passive elements. In the illustrated embodiment, the supporting plates 24 are square.

When the mobile platform 20 is mounted on the guideway mechanism 10, the frame 22 of the mobile platform 20 is sandwiched between two rails 122 of one branch 12 of the guideway mechanism 10. A height of the frame 22 is equal to that of each rail 122. The frame 22 includes four side walls 222 interconnected together. Each side wall 222 defines a rectangular through hole 224.

The two supporting plates 24 are respectively located and fastened at top and bottom ends of the frame 22, and are also respectively located at top and bottom sides of the branch 12 of the guideway mechanism 10. Each supporting plate 24 defines a through hole 242 in a center thereof, and four locating holes 244 around the through hole 242. For the top supporting plate 24, four protrusions 246 protrude down from four corners of the supporting plate 24. For the bottom supporting plate 24, four protrusions 246 protrude up from four corners of the supporting plate 24. For each supporting plate 24, an imaginary line connecting the four protrusions 246 is a square. The protrusions 246 of the supporting plates 24 are correspondingly received in the grooves 124 of the two rails 122 of any given branch 12 of the guideway mechanism 10.

In this embodiment, the first and second active elements respectively are first and second motors 262, 263 connected together. The first motor 262 has a rotating shaft 2622 at a center thereof. The second motor 263 has a rotating shaft 2632 at a center thereof. The rotating shaft 2632 of the second motor 263 is received in the rotating shaft 2622 of the first motor 262, so that the rotating shafts 2622, 2632 of the first and second motors 262, 263 do not affect each other when rotating. The first motor 262 is fastened on the bottom supporting plate 24.

In this embodiment, the first passive element includes two pairs of opposite rotating members 266 engaging with the actuating mechanism 264. Each rotating member 266 includes a circular passive wheel 2662, and a rod 2664 extending through the passive wheel 2662. The two pairs of rotating members 266 and the actuating mechanism 264 are received in the frame 22. The passive wheel 2662 of each rotating member 266 extends through the through hole 224 of a corresponding side wall 222 of the frame 22. Two ends of the rod 2664 of each rotating member 266 respectively extend through two corresponding locating holes 244 of the two supporting plates 24. A diameter of each of end portions of the rod 2664 is equal to or slightly less than a diameter of each locating hole 244, but smaller than a diameter of a main middle portion of the rod 2664. That is, an annular outer step is formed where each end portion of the rod 2664 extends from the main middle portion of the rod 2664. With this configuration, the supporting plates 24 abut the middle portion of the rod 2664 to limit movement of the rod 2664 along axial directions thereof.

The passive wheels 2662 of each pair of the rotating members 266 can contact inner side faces of two parallel rails 122 of one branch 12 of the guideway mechanism 10. Only the passive wheels 2662 of one pair of the rotating members 266 contact the inner side faces of the two parallel rails 122 of the one branch 12 at the same time, with the passive wheels 2662 of the other pair of the rotating members 266 being idle. When the two passive wheels 2662 contacting the rails 122 rotate, the mobile platform 20 is driven to move along the rails 122.

In this embodiment, the second passive element includes a substantially U-shaped supporting seat 286, a third motor 282, and two circular rotating wheels 284. The supporting seat 286 is placed on a top face of the top supporting plate 24. The supporting seat 286 includes a bottom plate 2862, and two side plates 2864 extending vertically upwardly from two ends of the bottom plate 2862. The third motor 282 has a rotating shaft 2822 running through two opposite ends thereof. Two ends of the rotating shaft 2822 of the third motor 282 extend through the two side plates 2864 of the supporting seat 286. The two rotating wheels 284 are fixed on the two ends of the rotating shaft 2822. A plane where each rotating wheel 284 is located is substantially perpendicular to a plane where the passive wheel 2662 of each rotating member 266 is located.

Figure 5:
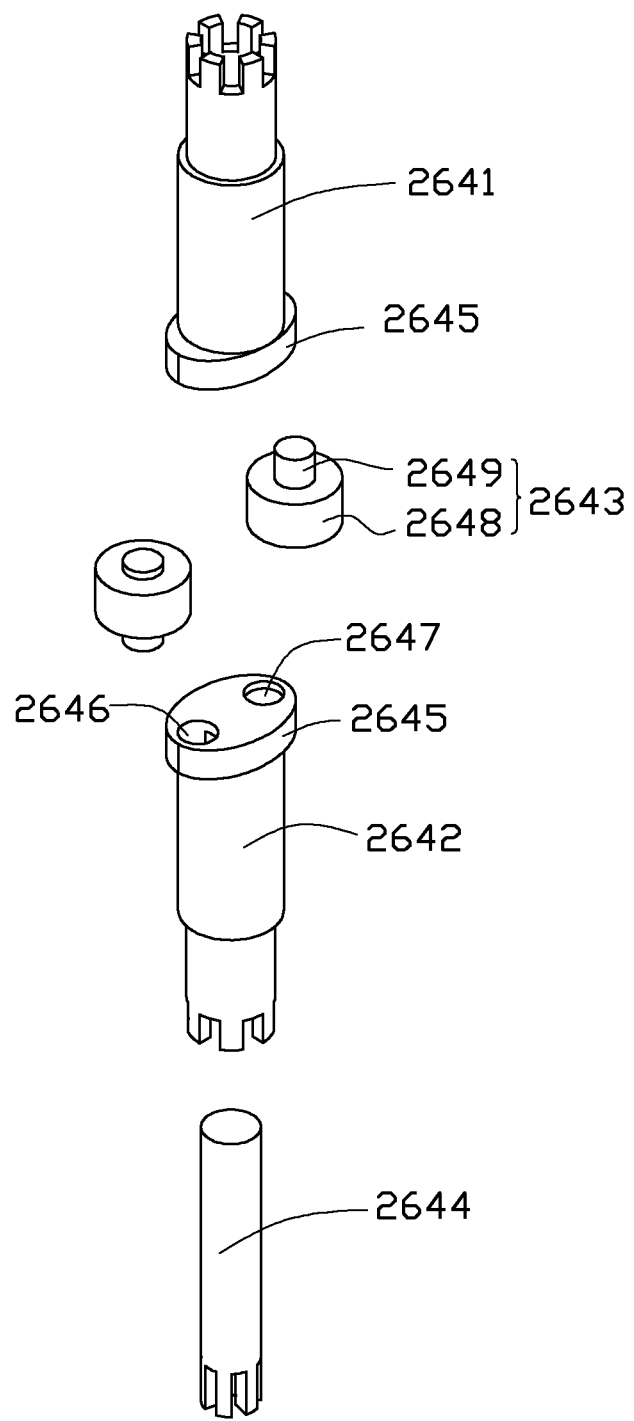
FIG. 5 is an enlarged, exploded view of an actuating mechanism of the mobile platform of FIG. 4.
Figure 6:
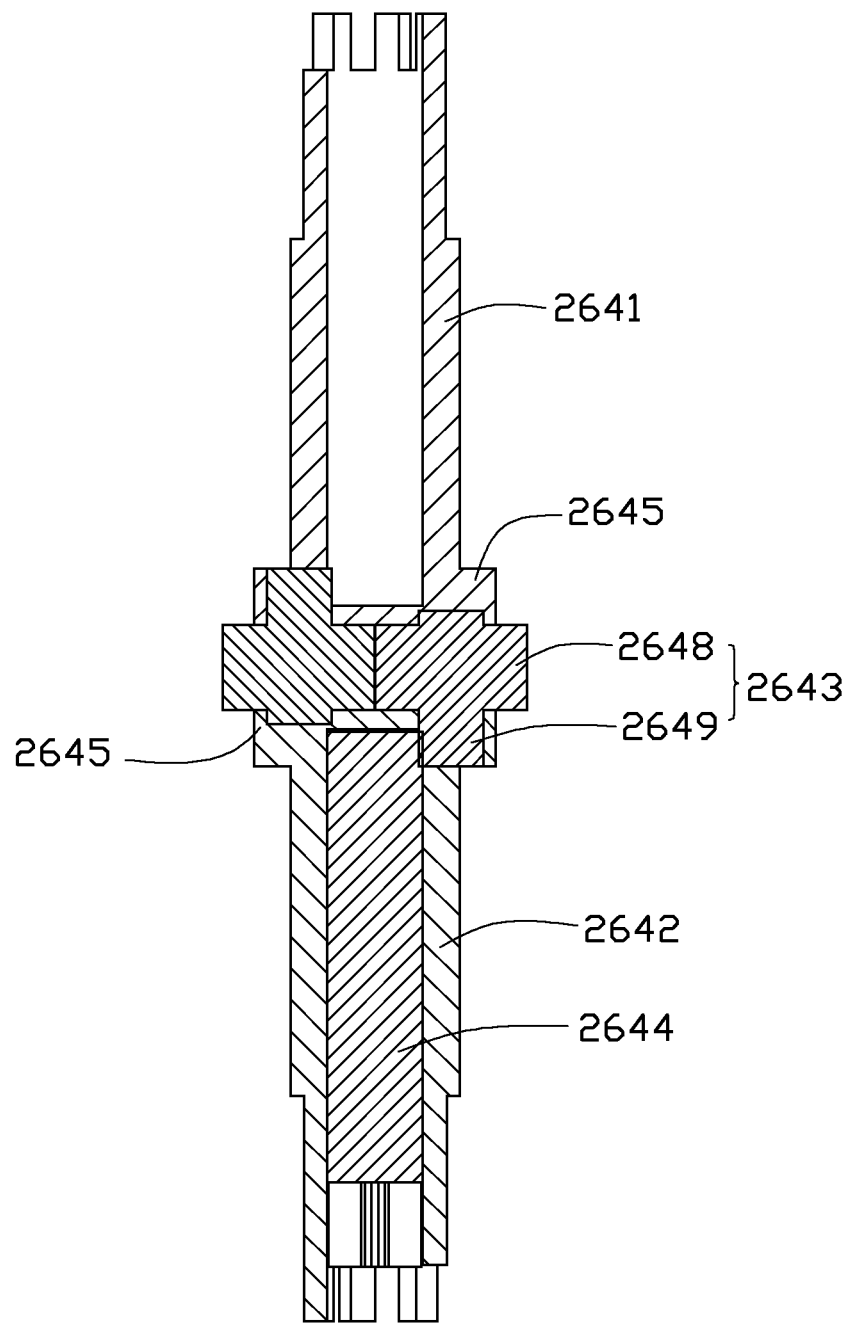
FIG. 6 is an enlarged, cross-sectional view of the actuating mechanism of the mobile platform of FIG. 4.

Also referring to FIGS. 5-6, the actuating mechanism 264 includes two hollow outer shafts 2641, 2642, two rotating wheels 2643 located between the two outer shafts 2641, 2642, and an inner shaft 2644 received in the outer shaft 2642. A bottom end of the inner shaft 2644 extends through the through hole 242 of the bottom supporting plate 24, and connects the rotating shaft 2632 of the second motor 263. In particular, the bottom end of the inner shaft 2644 has a plurality of teeth, which mesh with a plurality of teeth of a top end of the rotating shaft 2632. A bottom end of the outer shaft 2642 extends through the through hole 242 of the bottom supporting plate 24, and connects the rotating shaft 2622 of the second motor 262. In particular, the bottom end of the outer shaft 2642 has a plurality of teeth, which mesh with a plurality of teeth of a top end of the rotating shaft 2622. A top end of the outer shaft 2641 extends through the through hole 242 of the top supporting plate 24, and connects the bottom plate 2862 of the supporting seat 286. In particular, the top end of the outer shaft 2641 has a plurality of teeth, which mesh with a plurality of teeth (not visible) provided in the bottom plate 2862 of the supporting seat 286.

A diameter of the respective end portion of each of the outer shafts 2641, 2642 extending through the supporting plate 24 is equal to or slightly less than a diameter of the corresponding through hole 242 of the supporting plate 24, but smaller than a diameter of a main portion of the respective outer shaft 2641 or 2642. That is, an annular outer step is formed where the end portion of each outer shaft 2641, 2642 extends from the main portion of the respective outer shaft 2641 or 2642. With this configuration, the supporting plates 24 abut the main portions of the respective outer shafts 2641, 2642 to limit movement of the outer shafts 2641, 2642 along axial directions thereof.

A bottom end of the outer shaft 2641 forms an elliptic connecting portion 2645. A top end of the outer shaft 2642 forms another elliptic connecting portion 2645. Each connecting portion 2645 defines two receiving holes 2646, 2647 in two ends thereof. A depth of the receiving hole 2646 is larger than that of the receiving hole 2647. The receiving hole 2646 communicates with an inner chamber of the respective outer shaft 2641 or 2642, while the receiving hole 2647 is a blind hole isolated from the inner chamber of the respective outer shaft 2641, 2642.

Each rotating wheel 2643 includes a cylindrical body 2648, and a rod 2649 extending through the body 2648. The bodies 2648 of the rotating wheels 2643 are in contact with each other. The body 2648 of each rotating wheel 2643 contacts a corresponding passive wheel 2662. Two ends of the rod 2649 of the rotating wheel 2643 protrude out from two ends of the body 2648 of the rotating wheel 2643. One end (hereinafter, "the longer end") of the rod 2649 protrudes out further than the other one end (hereinafter, "the shorter end") of the rod 2649. The longer ends of the rods 2649 are received in the receiving holes 2646 of the two connecting portions 2645, and the shorter ends of the rods 2649 are received in the receiving holes 2647 of the connecting portions 2645. That is, the rotating wheels 2643 are oriented with each rotating wheel 2643 being inverted relative to the other one. A bottom end of the inner shaft 2644 contacts the longer end of the rod 2649 of a corresponding rotating wheel 2643.

In use of the mobile platform 20, the inner shaft 2644 of the actuating mechanism 264 is driven to rotate when the rotating shaft 2632 of the second motor 263 rotates. Since the inner shaft 2644 contacts the rod 2649 of the corresponding rotating wheel 2643, the two rotating wheels 2643 of the actuating mechanism 264 are driven to rotate when the inner shaft 2644 of the actuating mechanism 264 rotates. Since the passive wheels 2662 of one pair of opposite rotating members 266 contact the two rotating wheels 2643 of the actuating mechanism 264, the passive wheels 2662 of the pair of opposite rotating members 266 are driven to rotate when the two rotating wheels 2643 of the actuating mechanism 264 rotate. When the passive wheels 2662 of the pair of opposite rotating members 266 rotate, the mobile platform 20 is caused to move along the rails 122 of one branch 12 of the guideway mechanism 10.

When the mobile platform 20 arrives at the supporting bracket 16 of the guideway mechanism 10, the rotating wheels 284 contact the top plate 162 of the supporting bracket 16, and the rotating shaft 2632 of the second motor 263 stops rotating. The rotating shaft 2822 of the third motor 282 starts to rotate to make the rotating wheels 284 rotate, thereby driving the mobile platform 20 to move toward a center of the supporting bracket 16.

When the mobile platform 20 arrives at the center of the supporting bracket 16, the rotating shaft 2822 of the third motor 282 stops rotating, and the rotating shaft 2622 of the first motor 262 rotates about 90 degrees to drive the outer shafts 2641, 2642 of the actuating mechanism 10 to rotate about 90 degrees. The third motor 282 and the rotating wheels 284 are driven to rotate about 90 degrees when the outer shafts 2641, 2642 rotate about 90 degrees. The rotating wheels 2643 contact the passive wheels 2662 of the other pair of opposite rotating members 266 after the rotating wheels 2643 rotate with the outer shafts 2641, 2642 about 90 degrees. The rotating shaft 2822 of the third motor 282 continues to rotate to drive the rotating wheels 284 to rotate, and the mobile platform 20 is driven to move toward the rails 122 of another adjacent branch 12 of the guideway mechanism 10. When the mobile platform 20 reaches the other adjacent branch 12, the rotating shaft 2822 of the third motor 282 stops rotating. The rotating shaft 2632 of the second motor 263 starts to rotate to drive the mobile platform 20 to move along the rails 122 of the other adjacent branch 12.

According to the above descriptions, since all parts of the mobile platform 20 cooperate with each other, the mobile platform 20 can be automatically controlled to move along all the branches 12 of the guideway mechanism 10 as needed. Therefore when the manipulator of a robot is hung from the mobile platform 20, the mobile platform 20 can conveniently and precisely control a production line below the guideway mechanism 10.

It is to be understood, however, that even though numerous characteristics and advantages of the embodiment(s) have been set forth in the foregoing description, together with details of the structures and functions of the embodiment(s), the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An actuating mechanism comprising:
   first and second hollow outer shafts, each of the first and second outer shafts forming a connecting portion at one end thereof, each connecting portion defining two receiving holes;
   two rotating wheels located between the first and second outer shafts, each rotating wheel comprising a body and a rod extending through the body, the bodies of the rotating wheels being in contact with each other, two ends of the rod of each rotating wheel being correspondingly received in the receiving holes of the first and second outer shafts to connect the first and second outer shafts together; and
   an inner shaft received in the second outer shaft, one end of the inner shaft contacting the rod of one rotating wheel, wherein the inner shaft is rotatable in the second outer shaft to drive the two rotating wheels to rotate.

2. The actuating mechanism of claim 1, wherein a depth of one receiving hole of each connecting portion is larger than a depth of the other receiving hole of each connecting portion, the one receiving hole of each connecting portion communicating with an inner chamber of a respective one of the first and second outer shafts, the other receiving hole of each connecting portion being isolated from the inner chamber of the respective one of the first and second outer shafts.

3. The actuating mechanism of claim 2, wherein one of the two ends of the rod is longer than the other end of the rod, the longer end of the rod being received in the one receiving hole of the connecting portion, the shorter end of the rod being received in the other receiving hole of the connecting portion, and the one end of the inner shaft contacting the longer end of the rod.

4. A mobile platform comprising:
   the actuating mechanism of claim 1;
   a first supporting plate;
   a first motor fastened on a bottom of the first supporting plate and comprising a rotating shaft;
   a second motor connecting the first motor and comprising a rotating shaft, the second motor being located below the first motor, the rotating shaft of the second motor being received in the rotating shaft of the first motor, the second outer shaft and the inner shaft of the actuating mechanism being respectively connected to the rotating shafts of the first and second motors; and
   two pairs of opposite rotating members located above the first supporting plate and engaging with the two rotating wheels of the actuating mechanism, each of the rotating members comprising a passive wheel and a rod extending through the passive wheel, one end of the rod of each rotating member being rotatably received in the first supporting plate;
   wherein when one pair of opposite rotating members contact the two rotating wheels of the actuating mechanism, the other pair of opposite rotating members are idle;
   wherein the inner shaft of the actuating mechanism is driven to rotate when the rotating shaft of the second motor rotates, the two rotating wheels of the actuating mechanism are driven to rotate when the inner shaft of the actuating mechanism rotates, and the passive wheels of the one pair of opposite rotating members are driven to rotate when the two rotating wheels of the actuating mechanism rotate; and
   wherein the first and second outer shafts of the actuating mechanism are driven to rotate when the rotating shaft of the first motor rotates, and the two rotating wheels of the actuating mechanism are driven to rotate to contact the other pair of opposite rotating members when the first and second outer shafts of the actuating mechanism rotate.

5. The mobile platform of claim 4, further comprising a third motor and two rotating wheels, the third motor having a rotating shaft running through two opposite ends of the third motor, the two rotating wheels being fixed on two ends of the rotating shaft of the third motor, the first outer shaft of the actuating mechanism connecting the third motor.

6. The mobile platform of claim 5, wherein a plane where each rotating wheel of the third motor is located is perpendicular to a plane where the passive wheel of each rotating member is located.

7. The mobile platform of claim 5, further comprising a frame, the first supporting plate being fastened below the frame, the two pairs of opposite rotating members and the actuating mechanism being received in the frame, the frame comprising four side walls interconnected together, each side wall defining a rectangular through hole, the passive wheel of each rotating member extending through the through hole of a corresponding side wall of the frame.

8. The mobile platform of claim 7, further comprising a second supporting plate covering a top of the frame, the other end of the first outer shaft of the actuating mechanism and the other end of the rod of each rotating member being respectively rotatably received into the second supporting plate.

9. The mobile platform of claim 8, wherein four protrusions protrude from each supporting plate and face the frame.

10. The mobile platform of claim 9, wherein an imaginary line connecting the four protrusions is a square.

11. The mobile platform of claim 8, wherein each of the first and second supporting plates defines a through hole in a center thereof, the other ends of the first and second outer shafts of the actuating mechanism respectively extending through the through holes of the first and second supporting plates, the first and second supporting plates limiting movement of the first and second outer shafts along axial directions thereof.

12. The mobile platform of claim 11, wherein a diameter of the other end of each of the first and second outer shafts of the actuating mechanism being equal to a diameter of the through hole of each of the first and second supporting plates, but smaller than a diameter of a middle portion of each of the first and second outer shafts, the first and second supporting plates abutting against the middle portions of the first and second outer shafts.

13. The mobile platform of claim 12, wherein each of the first and second supporting plates defines four locating holes around the through hole, each end of the rod of each rotating member being respectively rotatably received in a corresponding locating hole of each of the first and second supporting plates, the first and second supporting plates limiting movement of the rods of the rotating members along axial directions thereof.

14. The mobile platform of claim 13, wherein a diameter of each end of the rod of each rotating member is equal to a diameter of the locating hole of each of the first and second supporting plates, but smaller than a diameter of a middle portion of the rod of each rotating member, the first and second supporting plates abutting against the middle portions of the rods of the rotating members.

15. The mobile platform of claim 5, further comprising a supporting seat placed on the second supporting plate, the supporting seat comprising a bottom plate and two side plates extending upwardly from two ends of the bottom plate, the two ends of the rotating shaft of the third motor extending through the two side plates of the supporting seat, the first outer shaft of the actuating mechanism connecting the bottom plate of the supporting seat.

16. The mobile platform of claim 15, further comprising a frame, the first supporting plate being fastened below the frame, the two pairs of opposite rotating members and the actuating mechanism being received in the frame, the frame comprising four side walls interconnected together, each side wall defining a rectangular through hole, the passive wheel of each rotating member extending through the through hole of a corresponding side wall of the frame.

17. The mobile platform of claim 16, further comprising a second supporting plate covering a top of the frame, the other end of the rod of each rotating member being rotatably received in the second supporting plate, the other end of the first outer shaft of the actuating mechanism extending through the second supporting plate to connect the bottom plate of the supporting seat.

18. The mobile platform of claim 17, wherein four protrusions protrude from each supporting plate and face the frame, an imaginary line connecting the four protrusions is a square.

19. The mobile platform of claim 4, wherein a depth of one receiving hole of each connecting portion is larger than a depth of the other receiving hole of each connecting portion, the one receiving hole of each connecting portion communicating with an inner chamber of a respective one of the first and second outer shafts, the other receiving hole of each connecting portion being isolated from the inner chamber of the respective one of the first and second outer shafts.

20. The mobile platform of claim 19, wherein one of the two ends of the rod is longer than the other one end of the rod, the longer one end of the rod being received in the one receiving hole of the connecting portion, the shorter one end of the rod being received in the other receiving hole of the connecting portion, the one end of the inner shaft contacting the longer one end of the rod.

* * * * *